Nov. 9, 1943. LE ROY H. FRAILING 2,333,993
INTERNAL COMBUSTION ENGINE
Filed July 23, 1941
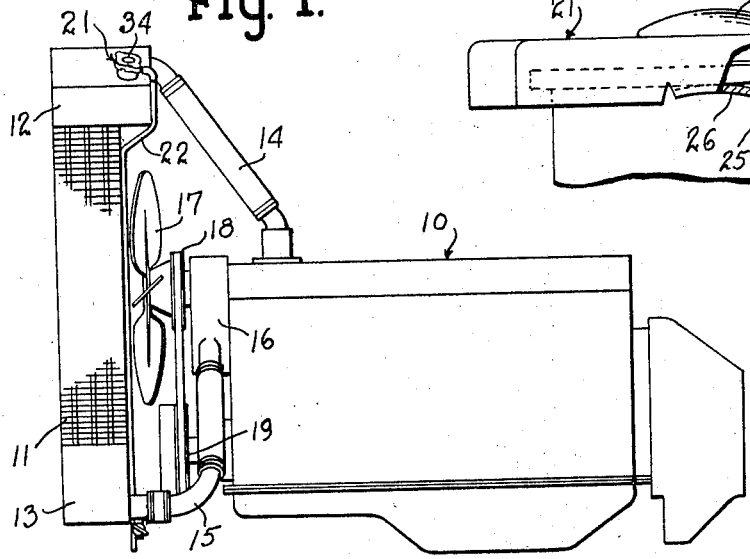
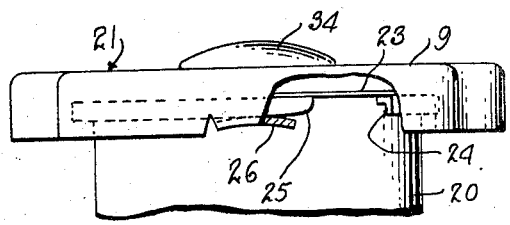
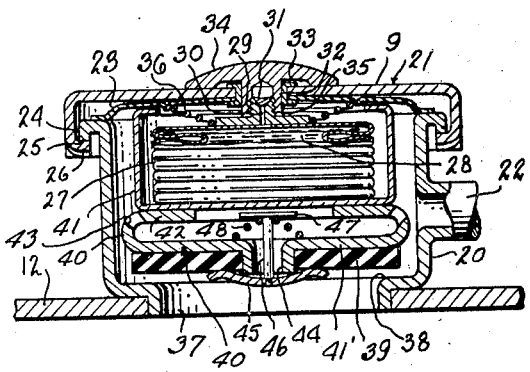
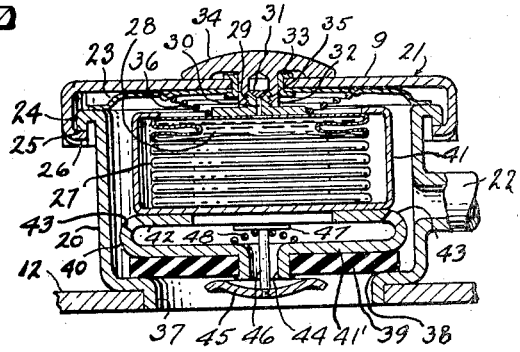
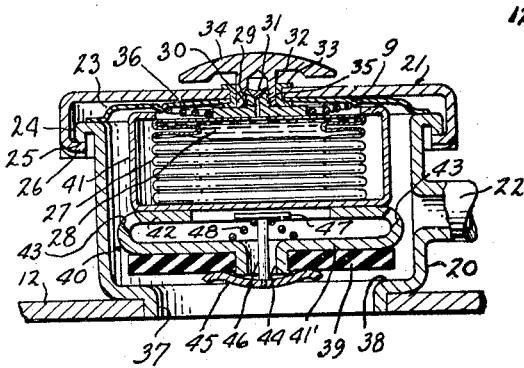
INVENTOR.
LeRoy H. Frailing
BY Sibbett & Hart
Attorneys Patented Nov. 9, 1943

2,333,993

UNITED STATES PATENT OFFICE 2,333,993

INTERNAL COMBUSTION ENGINE

Le Roy H. Frailing, Detroit, Mich., assignor to Packard Motor Car Company, Detroit, Mich., a corporation of Michigan Application July 23, 1941, Serial No. 403,739

8 Claims. (Cl. 123—178)

This invention relates to liquid cooling systems for engines and more particularly to pressure controlling devices for such systems.

Liquid cooling systems for engines usually include a radiator having a filler neck with an open end closed by a detachable cap. The neck is usually provided with a vent that communicates with atmosphere to provide an overflow outlet for the cooling medium in the otherwise closed system.

In order to reduce the heat exchange surface of the radiator, automatic valve devices have been associated with cooling systems to shut off the vent to atmosphere so that the temperature at which the cooling medium will boil is thereby raised. These valve devices have included a bi-metal thermostat and a spring that operates to seal the system while the temperature therein is in some predetermined range, for example between 195° and 225°. The thermostat acts to open the valve below 195° and to close it above such temperature, while the spring acts to retain the valve in thermostat closed position until overcome by the pressure developed in the system at 225°. Such devices have been generally unsatisfactory because the bi-metallic thermostat acts too slowly in moving the valve to open and closed positions and because of unreliable characteristics caused by design.

An object of this invention is to provide a fluid heat exchange system for engines with an efficient pressure control means, of the type referred to, that can be manufactured and installed at a relatively low cost.

Another object of the invention is to provide a unit thermostat structure that can be detachably carried by a radiator filler cap for controlling pressure in an engine heat exchange system so that a relatively small, lightweight and rugged radiator structure can be utilized.

Still another object of the invention is to provide a thermostat valve unit carried by the radiator cap of an engine cooling system consisting of a thermostat bellows and valves that will act to maintain the pressure in the cooling system within predetermined limits.

A further object of the invention resides in the provision of a valve structure, of the character referred to, that is comprised of a minimum number of parts that can be manufactured and assembled at low cost.

Other objects of the invention will appear from the following description taken in connection with the drawing, which forms a part of this specification, and in which:

Fig. 1 is a side elevational view of the engine and a cooling system incorporating the invention;

Fig. 2 is a side elevational view of the radiator filler neck and cap, partly broken away and in section to show the securing means;

Fig. 3 is a fragmentary sectional view through the filler neck portion of the radiator, its cap and the pressure control device, such device being shown in the position occupied below a predetermined temperature in the cooling system;

Fig. 4 is a view similar to that shown in Fig. 3, the valve device being shown in closed position with the pressure in the cooling system below atmospheric pressure;

Fig. 5 is a view similar to Figs. 3 and 4 but showing the valve device in the open position occupied when there is maximum pressure in the cooling system.

Referring now to the drawing by characters of reference, 10 indicates a conventional type of engine that is provided with internal chambers through which a cooling medium, such as water, circulates in heat exchange relation. The cooling system includes a radiator 11 having a top tank 12 and a lower tank 13. The top tank is connected with the outlet end of the cooling chamber in the engine by connection 14 and a connection 15 leads from the lower tank of the radiator to the housing 16 of a conventional engine operated pump. This pump housing connects with the inlet end of the engine cooling chamber.

Air is moved through the radiator by means of a conventional fan 17 rotated by a belt 18 driven by pulley 19 operated by the engine. The engine and cooling system so far described have been conventional for many years and a further description is not believed to be necessary for a clear understanding of this invention.

It has been customary to provide the upper tank of engine heat exchange radiators with vent means, in the form of a filler neck 20, to the open end of which a closure cap structure 21 is detachably secured. It has also been customary to establish communication between the cooling system and air by the provision of an overflow conduit leading from the filler neck, as indicated at 22. In the present invention the filler neck deviates somewhat in design from the conventional in order to cooperate with a pressure control device as will appear hereinafter.

The cap structure 21 includes a cap 9 and a flexible metal disk 23. The disk will engage against and seal the outer end of the filler neck when the cap structure is attached. The outer end of the neck is formed with a downwardly turned flange 24 on which cam surfaces 25 are formed to be engaged by laterally extending ears 26 on the cap 9. The cap structure is applied to the neck with the ears between the cam surfaces 25 and is rotated until the ears wedge against the cam surfaces. The cap structure so far described is conventional.

A pressure control thermostat unit is arranged in the filler neck and is preferably detachably secured to the cap structure in a relation such that it will be in operative position when the cap structure is attached to the filler neck. This control unit includes a thermostat bellows 27 containing a suitable medium 28 that will axially elongate or contract the bellows in response to temperature conditions in the cooling system. A filler nipple 29 is fixed to the top wall of the bellows and has a passage 30 extending axially therethrough by means of which the temperature responsive medium 28 can be introduced into the bellows. The outer end of this passage 30 is suitably sealed by a layer of solder 31.

The bellows is slidably attached to the cap structure by means of guide stem 32 extending through hollow rivet 33 applied to cap 9, this rivet also being utilized in this instance to secure the flexible disk 23 to the cap. The outer end of the stem, projecting through the hollow rivet, is enlarged to provide a head 34 and the inner end of the stem is threaded so that it can be screwed upon a threaded portion 35 of nipple 29. The guide stem 32 can slide axially in the rivet 33 and movement of the bellows away from the inner face of the cap structure is limited by the head 34 engaging against the cap 9. A coil spring 36 is arranged between the upper end wall of the bellows and the cap straucture and normally holds the bellows projected from the cap structure to the maximum extent permitted by the stem head.

The radiator filler neck shown herein has an inner end 37 of reduced diameter for the purpose of providing a shouldered valve seat 38 below the junction of the overflow outlet 22 with the neck. A valve for engaging this seat, to seal the cooling system from atmosphere through the overflow outlet, is in the form of a disk 39 and it can be formed of relatively hard rubber or any suitable composition that can be utilized with a heat exchange medium employed for engines. This valve is arranged to move with the lower end of the bellows and is shown attached to a carrier 40 that can be fixed to the bellows or to a stop member 41 attached to the lower end of the bellows, but in any event it is desirable that this valve should travel with the lower end of the bellows. In the present instance the carrier is formed of sheet metal and comprises a base wall 41', against which the valve disk 39 is suitably fixed, joined to a spaced upper wall 42.

Spring 36 urges the bellows into its extreme lower position as permitted by the head on the guide stem 32 and in such position when the temperature in the cooling system is below some predetermined point, for example 190°, the valve will be clear of seat 38. Fluid in a full cooling system will expand to some extent before it reaches the temperature mentioned and is free to flow to the outlet 22 as the valve 39 will be open, the position of the thermostat unit under such circumstances being shown in Fig. 3. When the temperature in the cooling system reaches 190°, or whatever predetermined degree is decided upon below the normal boiling point of the cooling fluid, the bellows will expand axially and will carry the valve 39 therewith to engage the seat 38, as shown in Fig. 4, and thereby seal off the fluid cooling system from the outlet 22 that is open to atmosphere. With the bellows expanded the valve can be unseated only by pressure in the cooling system and the extent of such pressure required to unseat the valve is determined by the pressure exerted by spring 36. This spring pressure can be such as to hold the valve seated until some desired pressure in the cooling system is reached, as caused by temperature above the normal boiling point of the fluid in the cooling system, the valve being shown in such unseated relation in Fig. 5. The arrangement can be such that the valve will not be open until the temperature in the system reaches approximately 225° which can be the boiling point for the cooling fluid when the system is sealed.

The structure so far described takes care of increased pressure conditions in the cooling system but it does not provide for pressure conditions in the cooling system less than atmospheric resulting from cooling of the heat transfer medium while the valve 39 is closed. In order to take care of such a vacuum condition, a valved by-pass means is provided. The carrier 40 is made considerably larger in diameter than the bellows and is provided with a plurality of ports 43 in its upper wall 42 and with an axially extending flange 44 forming a passage. The passage through the lower wall 41' of the valve carrier and the parts 43 form passageways that are in communication with atmosphere through the overflow outlet 22. The passage in the lower wall of the carrier is normally closed by one-way valve means associated with the passage in the flange 44. Flange 44 projects through a central opening in the valve member 39 and the end thereof can be spun over to retain the valve member. Valve 45 is arranged beneath the flange to engage against the valve member 39 to shut off communication between the cooling system and atmosphere through the by-pass. A stem 46 is screwed into the valve 45 and extends through the passage formed by the flange 44, this stem having a head 47 located between the upper and lower walls of the carrier. Coil spring 48 is arranged between head 47 and base wall 41' of the valve carrier to normally hold the valve 45 seated against the valve member 39. This spring 48 is selected to exert pressure which will be overcome by a desired pressure drop in the cooling system below atmospheric pressure. For example, the spring can be arranged to permit the valve 45 to be opened when the pressure in the cooling system becomes one pound less than atmospheric pressure. When the valve 45 is thus opened pressure in the cooling system will rise and thus cannot drop below the one pound less than atmospheric pressure. The radiator and connections will thus be prevented from collapsing under the force of pressure reduction in the cooling system. As the valve 39 will be open below 195°, and will open above 225°, due to the developed pressure overcoming the action of spring 36, and as the system will be opened to atmosphere when there is a one pound pressure drop below atmospheric pressure when the valve 39 is closed, the possible pressure range in the cooling system is limited.

Through the use of the thermotat unit, the cooling system will be open to atmosphere during initial expansion of the cooling fluid and will be sealed below some predetermined high temperature to raise the normal boiling point of the cooling fluid. As a result, the radiator structure can be reduced in cooling area and of relatively light weight as the internal pressures are controlled to hold "breathing" within small limits. The stop member 41 is employed to limit the axial extension of the flexible metal bellows 21 so that it can not be distorted sufficiently to take a permanent set.

Although the invention has been described in connection with a specific embodiment, the principles involved are susceptible of numerous other applications which will readily occur to persons skilled in the art. The invention is therefore to be limited only as indicated by the scope of the appended claims.

What is claimed is:

1. In a fluid circulating engine cooling system having a radiator, a radiator filler neck having an outlet intermediate its ends open to atmosphere and a shouldered base portion forming a valve seat, a sealing cap structure detachably applied to the outer end of said neck, a thermostat bellows adjacent the base of said cap structure, a carrier fixed to move with the base end of said bellows, a disk valve fixed to the carrier and adapted to engage the neck seat to seal the system from atmosphere, a stem fixed to the upper end of said bellows and connected with the cap structure for limited axial movement relative thereto, a spring between the cap structure and the bellows projecting said bellows to maximum position away from said cap structure, said valve being clear of said seat when the bellows is contracted and in extreme position away from said cap structure, said valve engaging said seat upon axial expansion of said bellows in response to a temperature below that at which pressure in the system will overcome said spring to unseat the valve, said valve and carrier having passage means therethrough open to atmosphere, and a valve member movable with and engaging said disk valve to shut off the passage means, said valve member moving out of closed position in response to a predetermined pressure drop in the cooling system below atmospheric pressure.

2. In a liquid cooling system for an engine, the combination with vent means for the system, of means for closing the vent means during a predetermined high temperature range in the system including a valve member having a port therein through which the system communicates with atmosphere, and valve means closing said port but opening said port in response to a predetermined pressure drop in the system below atmospheric pressure.

3. In a liquid cooling system for an engine, the combination with vent means for the system, of a valve member adapted to seat in the vent means, means for seating said valve member in the vent means during a predetermined range of high temperature in the system, and means for by-passing the valve member while seated only in response to a predetermined pressure drop in the system below atmospheric pressure.

4. In a liquid cooling system for an engine, the combination with vent means for the system, of a valve member adapted to seat in the vent means, a bellows thermostat operatively connected to seat said valve member when extended, a spring engaging the bellows thermostat opposing opening thereof when seated, and means by-passing the valve, when seated, in response to a predetermined pressure drop in the system below atmospheric pressure.

5. In a fluid cooling system for an engine having a radiator filler neck with a top, a shouldered base portion forming an interior valve seat and an outlet to atmosphere between the top and the seat, and a sealing cap structure detachably applied to the top of the filler neck, control means comprising a thermostat bellows adjacent the base of said cap structure, a disk valve movable with the bottom of said bellows for engaging the seat in said filler neck, means connecting the top of said bellows with said cap structure for a limited axial movement relative thereto, and a spring acting between the top of said bellows and said cap structure normally urging the bellows away from the cap structure, said valve clearing the seat below a predetermined temperature in the cooling system and engaging the seat above such temperature due to contraction and expansion of the bellows, said valve being unseated against the action of the spring while the bellows is expanded when pressure in the cooling system developed by a predetermined temperature above the normal boiling point of the cooling fluid is present.

6. A control device for engine cooling systems having a vented radiator filler neck and a sealing cap structure applied to the radiator filler neck comprising a thermostat bellows depending from the underside of said cap structure, a valve movable with said bellows, a stem fixed to said bellows and mounted to move axially through said cap structure, a head on said stem on the upper side of said cap structure, and a spring between the bellows and the underside of said cap structure urging said bellows away from said cap structure to the extent allowed by said head, the engagement of said head with said cap structure limiting the inward movement of the bellows to hold the valve unseated when the temperature in the cooling system is below some predetermined degree.

7. A pressure control device for engine cooling systems having a vented radiator filler neck with a valve seat therein and a cap applied to the neck comprising a thermostat bellows located beneath the cap, a valve connected to one end of the bellows and engageable with the seat, a guide stem fixed to the other end of the bellows and slidable through the cap, means on said stem above said cap and engageable therewith to limit the movement of the guide stem sufficiently to prevent seating of the valve when the temperature in the cooling system is below a predetermined degree, and a spring between the bellows and the cap urging the bellows away from the cap.

8. A control device for an engine cooling system having a neck with a vent and a valve seat between the system and the vent, a cap applied to the neck, a disk valve engageable with the seat in the neck, a carrier for the valve, a thermostat bellows having one end fixed to the carrier and the other end adjacent the cap, a spring acting to space the cap and the adjacent end of the bellows, a guide rod slidably mounted through the cap and fixed to the bellows, and means on the end of the rod outside of the cap limiting movement of the bellows and carrier above a predetermined temperature in the system to an extent unseating the valve, the valve being seated above such predetermined temperature by expansion of the bellows and being unseated above such predetermined temperature by predetermined pressure in the system sufficient to bias said spring.

LE ROY H. FRAILING.

DISCLAIMER 2,333,993.—*Le Roy H. Frailing*, Detroit, Mich. INTERNAL COMBUSTION ENGINE. Patent dated Nov. 9, 1943. Disclaimer filed June 24, 1946, by the assignee, *Packard Motor Car Company*.

Hereby enters this disclaimer to claim 2 of said Letters Patent.

[*Official Gazette July 30, 1946.*]